Dec. 15, 1942.   F. J. NOWICKE   2,305,188
ELECTRODE HOLDER
Filed Jan. 20, 1942   2 Sheets-Sheet 1
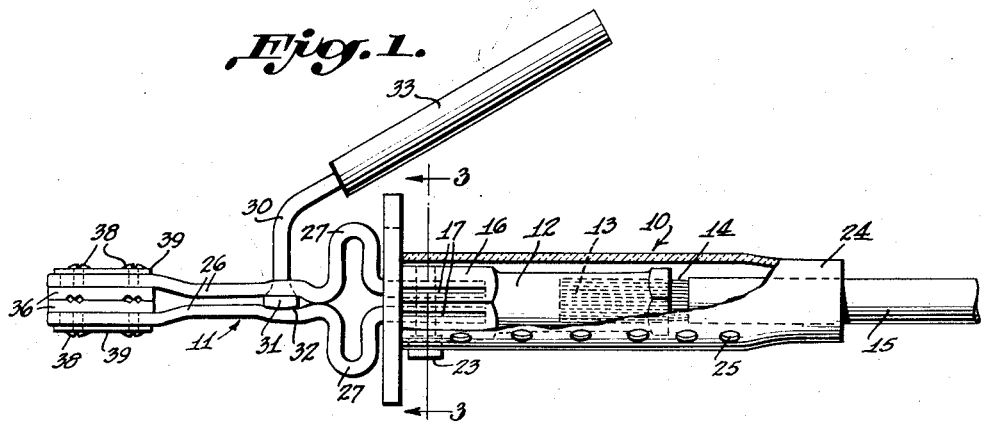
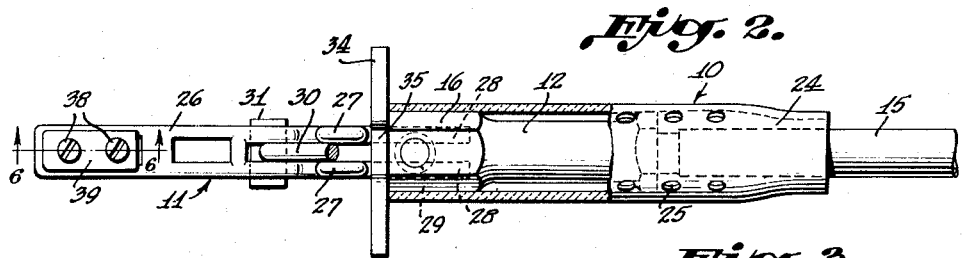
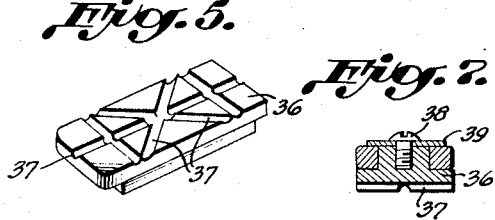
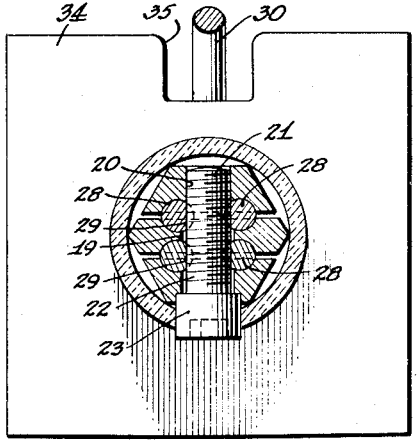
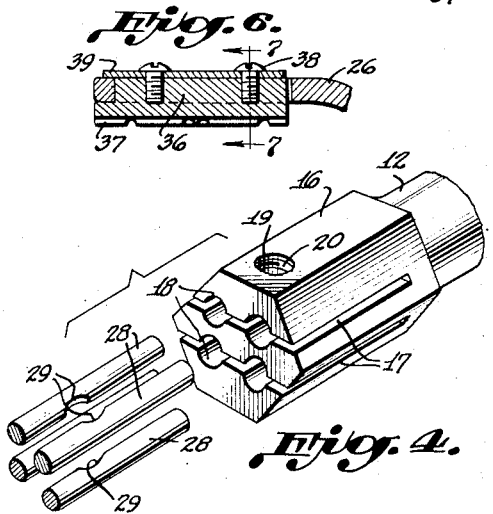
Inventor
FRANK J. NOWICKE
By Ben Cohen
Attorney Dec. 15, 1942.  F. J. NOWICKE  2,305,188
ELECTRODE HOLDER
Filed Jan. 20, 1942  2 Sheets-Sheet 2
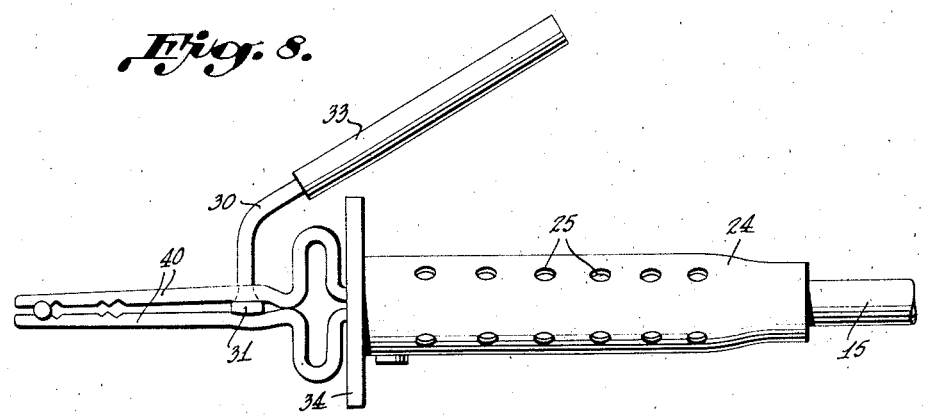
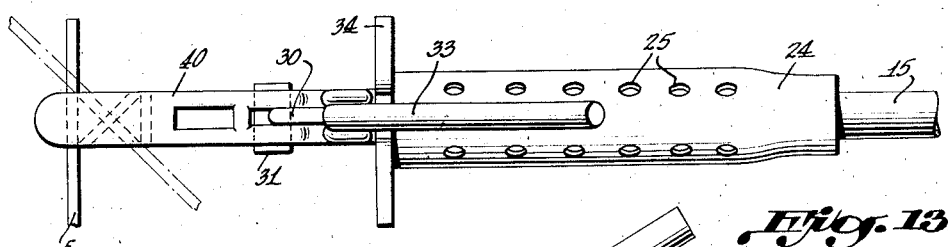
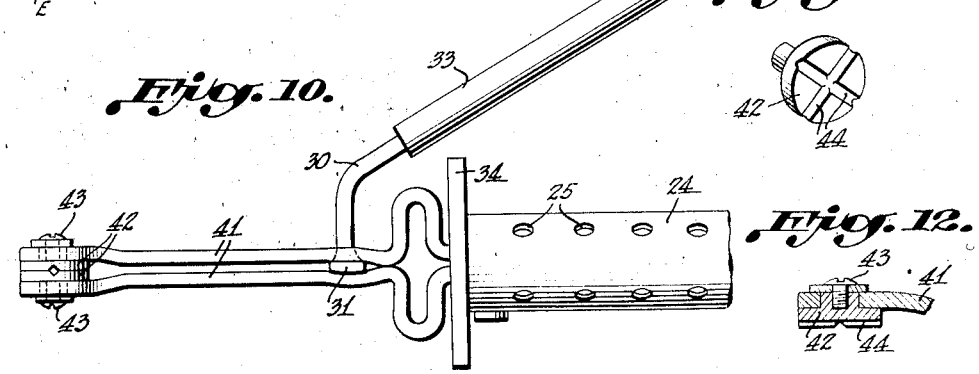
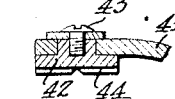
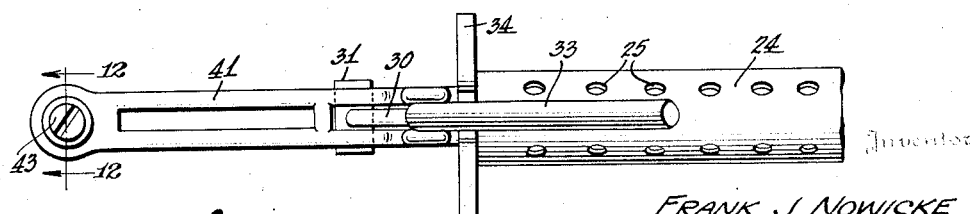
FRANK J. NOWICKE Patented Dec. 15, 1942

2,305,188

UNITED STATES PATENT OFFICE 2,305,188

ELECTRODE HOLDER

Frank J. Nowicke, Hanover, Md.

Application January 20, 1942, Serial No. 427,489

3 Claims. (Cl. 219—8)

This invention relates to electrode holders and more particularly to an electrode holder for use in arc welding or the like in which the jaw portions of the holder are detachable from the base or handle portion.

The main objects of the present invention is to provide an electrode holder of such improved construction and arrangement that its manufacture is made relatively simple and its use rendered very convenient.

A further object of the invention is to provide for the ready removal of dirt and debris from the holder by facilitating the disassembly of the electrode clamping jaws and the mechanism for spreading them apart.

A still further object of the present invention is to provide a holder wherein the various parts are in tight contact to prevent short-circuiting.

Another object of the invention is to adapt the electrode holding parts for clamping the electrode at any convenient angle relative to the axis of the tool and to so mount said parts as to make them readily replaceable when worn.

These and other detailed objects of the invention will be apparent from the following description, reference being had to the accompanying drawings, in which—

Figure 1 is a side elevational view of an electrode holder embodying my improvements;

Figure 2 is a top plan view of the holder shown in Figure 1;

Figure 3 is a sectional view taken on line 3—3 of Figure 1;

Figure 4 shows an expanded view of the base clamping means;

Figure 5 is a detail perspective view of the electrode holding part;

Figure 6 is a detail section through the forward end of the holder showing the manner of mounting the electrode holding part;

Figure 7 is a detail sectional view taken on the line 7—7 of Figure 6.

Figure 8 is a side elevational view of a second form of the invention;

Figure 9 is a top plan view of the holder shown in Figure 8.

Figure 10 is a side elevational view of a third form of the invention;

Figure 11 is a top plan view thereof;

Figure 12 is a transverse sectional view taken on the line 12—12 of Figure 11;

Figure 13 is a detail view of one of the electrode holding parts.

In the drawings wherein are shown several embodiments of the invention, reference is had to Figures 1 to 7 inclusive for one of the preferred forms of the invention. The device comprises a handle portion 10 and a jaw portion 11. The handle portion 10 comprises a connector 12 formed of metal, said connector being substantially solid throughout but provided at its rear end with a cavity 13 to receive the wires 14 of electrical conduit 15. The wires are soldered or otherwise secured to connector 12 to make positive electrical contact therewith. The forward end of connector 12 comprises a sleeve portion 16, said sleeve being split into three sections by means of transverse slots 17. The inner faces of the slotted portions are provided with longitudinal grooves 18 for a purpose to be described. The sleeve 16 is further provided with a transverse bore 19 terminating at one end in threaded portion 20 adapted to receive the threaded end 21 of clamping bolt 22. Clamping bolt 22 is provided with an enlarged countersunk head 23 adapted to bear against an outer face of sleeve 16. As a result of this construction, the bolt 22 is well adapted to tightly draw together the split sections of sleeve 16 in assembling the jaw portion 11 and handle portion 10.

A cylindrical guard or handle member 24 fits over the connector and is held in position by means of the enlarged head portion 23 passing through an opening in member 24. The guard may preferably be made of fiber or of other suitable insulating material so that the operator will be protected from the current passing through the connector 12. Openings 25 are provided in the guard member and provide for circulation of air through the handle member and for dissipating heat.

The jaw structure comprises a pair of jaws 26 designed to receive and clamp an electrode therebetween. The jaws are preferably made of steel or some similar material in order that they may have a suitable amount of spring or resiliency between them so that they will clamp down upon the electrode after they have been spread apart and the electrode inserted. The resiliency of the jaws 26 are increased by providing opposed bowed portions 27 which are located adjacent the handle at the rear end of the jaw structure. The bowed portions 27 have the further function of increasing the amount of material between the forward end of the jaws and the handle portion thereby tending to reduce the transfer of heat from the electrode to the handle.

Each of the jaws 26 is provided with free ends 28 in the form of wires and receivable in longitudinal grooves 18. The wire ends are notched at 29 to permit passage of bolt 22 as seen in Figure 3, the construction being such as to rigidly clamp the jaws to the connector but which will permit ready separation by merely removing the clamping bolt. It may be noted at this time that the clamping bolt 22 serves the double function of clamping the jaw structure to the connector member and of locking the handle member 24 in position.

The spreading of the jaws may be readily accomplished by means of a stirrup member 30 having a portion 31 inserted between the jaws which are recessed at 32 to receive said portion. The stirrup member is further provided with an insulated handle portion 33 designed to extend rearwardly over the handle of the tool, where it may conveniently be manipulated by the operator. It will be apparent that if the handle 33 is moved downwardly from the position shown in Figure 1, the jaws will be spread apart by the part 31 and the electrode may then be inserted.

A guard 34 of insulating material may be slipped over the rear ends of the jaws to lodge against the handle portion of the tool, the guard being provided with a cutout or recessed portion 35 within which the member 33 may be moved.

The front ends of the jaws 26 are recessed to receive portions of gripping members 36, the gripping faces of which are provided with a plurality of complementary grooved portions 37 to hold an electrode E in any one of a plurality of positions. As seen in Figures 6 and 7, the gripping members are removably secured to the jaws by means of screws 38 and locking plates 39.

In Figure 8, I have illustrated a modified form of the invention relating to the clamping jaws, the handle means and securing means being the same as described in connection with the form of the invention shown in Figures 1 to 7. In this form of the invention, the gripping faces of jaws 40 are formed as an integral part of the jaw structure as distinguished from the removable gripping faces shown in the first form of the invention.

In Figures 10 to 13 inclusive, the gripping jaws 41 are somewhat similar to the gripping jaws shown in Figure 1. In this form, however, the gripping members for the electrode are different. The gripping members comprise circular members 42 provided with grooves 44 and locked to the jaws 41 by means of screws 43 in the same manner as described in connection with the first form of the invention. As seen in Figure 13, the gripping face has only two grooves. However, the construction of the gripping members permits rotation of said members into any desired position and the electrode may be held at any angle with respect to the axis of the tool. It is well known that electric welders like to adjust the angle of the electrode to suit their personal preference and this shaping of the clamping or gripping portions of the jaws accommodates such preference.

Thus it will be seen that I have described a construction well adapted to produce the various objects and advantages pointed out above. While I have shown and described several embodiments of the invention, it will be understood that it is not to be limited to all of the shown but may be modified within the scope of the appended claims.

What I claim is:

1. An electrode holder comprising a handle portion and a jaw portion, said jaw portion comprising a pair of jaw members, each of said jaw members having its rear portion terminating in split ends, a stirrup member insertable between the split ends of one of the jaw members, a connector in said handle portion, said connector having a split end, a bolt for drawing the split sections together, the split ends of the jaw portions being receivable in the split end of the connector and being locked thereto by said bolt.

2. An electrode holder comprising a handle portion and a jaw portion, said jaw portion comprising a pair of jaw members, each of said jaw members having its rear portion terminating in split ends, a stirrup member insertable between the split ends of one of the jaw members, a connector in said handle portion, said connector having a split end, a bolt for drawing the split sections together, the split ends of the jaw portions being receivable in the split end of the connector and locked thereto by said bolt, and a sleeve member on said connector, said bolt passing through the sleeve member to lock said member to the connector.

3. An electrode holder comprising a handle portion and a jaw portion, said jaw portion comprising a pair of jaw members, each of said members having its rear portion terminating in split ends, said split portion extending substantially midway of the jaw member and having a bowed portion formed therein, a stirrup member insertable between the split ends of one of the jaw members, a connector in said handle portion, said connector having a split end, a bolt for drawing the split sections together, the split ends of the jaw portions being receivable in the split end of the connector and being locked thereto by said bolt.

FRANK J. NOWICKE.